United States Patent
Lin et al.

(10) Patent No.: US 9,752,763 B2
(45) Date of Patent: Sep. 5, 2017

(54) WEATHERPROOF LIGHT STRING

(71) Applicant: American Lighting, Inc., Denver, CO (US)

(72) Inventors: Chia-Kuang Lin, Denver, CO (US); James Chih-Hsin Lee, Dongguan (CN)

(73) Assignee: American Lighting, Inc., Denver, CO (US)

( * ) Notice: Subject to any disclaimer, the term of this patent is extended or adjusted under 35 U.S.C. 154(b) by 111 days.

(21) Appl. No.: 14/939,582

(22) Filed: Nov. 12, 2015

(65) Prior Publication Data

US 2017/0138577 A1    May 18, 2017

(51) Int. Cl.
| | |
|---|---|
| *F21V 23/00* | (2015.01) |
| *F21V 23/06* | (2006.01) |
| *F21S 4/00* | (2016.01) |
| *F21V 31/00* | (2006.01) |

(52) U.S. Cl.
CPC ............ *F21V 23/002* (2013.01); *F21S 4/001* (2013.01); *F21V 23/06* (2013.01); *F21V 31/00* (2013.01)

(58) Field of Classification Search
CPC ........ F21V 23/002; F21V 23/06; F21V 31/00; F21V 21/008; F21V 21/08; F21V 21/088; F21V 99/00; F21S 4/001; F21S 4/00; F21S 4/10; F21S 4/15; H01R 25/003; H01R 13/64
See application file for complete search history.

(56) References Cited

U.S. PATENT DOCUMENTS

| | | | |
|---|---|---|---|
| 1,512,888 A | 10/1924 | Haft | |
| 1,758,982 A | 5/1930 | Seghers | |
| 1,818,884 A | 8/1931 | Eckstein | |
| 1,974,472 A | 9/1934 | Seghers | |
| 2,201,045 A | 5/1940 | Lundstrom | |
| D181,034 S | 12/1957 | Bossi | |
| 5,234,360 A | 8/1993 | Kramer, Jr. | |
| 6,540,549 B2 * | 4/2003 | Rupert ................. | H01R 25/003 439/215 |
| 8,827,728 B1 * | 9/2014 | Lin ....................... | F21V 21/002 439/168 |
| 9,033,548 B2 * | 5/2015 | Tsai ....................... | F21V 23/06 362/249.06 |

* cited by examiner

*Primary Examiner* — Bao Q Truong
(74) *Attorney, Agent, or Firm* — Michael M. McGaw; Smith & Hopen, P.A.

(57) ABSTRACT

A weatherproof light string employing a T-shaped inner frame with grooves to direct the placement of a plurality of conductors and apertures to secure conductive pins connecting conductors. The light string has secondary cables connected to the primary cables at one end and lamp holders at the other end. The insulation core wires at the first end of the secondary cable are positioned on the insulation core wires of the first cable by a T-shaped inner frame in a clamping and overlapping manner. Conductive pins extend through a side wall of the T-shaped inner frame and pierce the overlapped insulation core wires to from a mechanical and electrical connection between the wires. Light strings employing the T-shaped inner frame and conductive pins provide a more robust and reliable product, and are better suited to automation. Also disclosed is a method for manufacturing the light string.

12 Claims, 12 Drawing Sheets

WEATHERPROOF LIGHT STRING

FIELD OF INVENTION

This invention relates to the field of lighting. More specifically, this invention relates to a weatherproof outdoor light string and a manufacturing method thereof.

BACKGROUND OF THE INVENTION

Outdoor light strings are popular and versatile light sources that can be used to illuminate an outdoor area by suspending a string of lights across or above the area to light the surrounding environment. These light strings can generally be characterized as having a central electrical cable of a length often about twelve (12) to eighteen (18) meters. A plurality of secondary cables are affixed to, and in electrical communication with, the central cable at roughly equidistant points. At the opposite end of the secondary cable is a lamp holder with a lamp bulb in the lamp holder. The secondary cables are designed to hang from the suspended central cable and the amount by which they hang below the central cable is determined by the length of the secondary cable. More specifically, the secondary cables are typically spaced at one-half (½) to one (1) meter intervals along the central cable, with the secondary cable having a length of roughly five (5) to ten (10) centimeters, although the overall length of the light string, the length of the secondary cables and the spacing of lights can be varied to meet consumer demand.

The central electrical cable has a first end and a second end, with a male plug at the first end and a female plug at the second end. A plurality of light strings can be strung together by attaching the female plug of a first string to the male plug of a second string. The outdoor light strings often will have a heavy-duty coating, such as of PVC, to help protect the light string from the elements typically encountered in outdoor use.

Light strings have been known for many years. For example, U.S. Pat. No. 1,758,982 to E. P. Seghers discloses an invention entitled "Decorative Wiring." The invention is described "as an arrangement of wires for supplying current to electric light in series and has for one of its objects the provision of an arrangement of supply wires and lights for decorative purposes, and which shall adapt itself to extension by the addition of any number of sets of lights within the carrying capacity of the supply wires." The '982 patent has a employs a design that would not be considered aesthetically pleasing by today's standards and is crude in its implementation. Numerous improvements have been made in the intervening years. However, further improvements are still needed to reduce the costs of the lights and streamline production. The present invention provides some of these widely desired improvements for outdoor light strings as will become evident in the following disclosure.

SUMMARY OF THE INVENTION

The long-standing but heretofore unfulfilled need for is now met by a new, useful, and nonobvious invention. In a first aspect the present invention provides a light string having a first cable of a predetermined length with an outer sheath, and a plurality of second cables. The first cable has at least two insulation core wires A, and provided with at one end thereof a male plug and at the other end thereof a female plug that can be matched with said male plug. Spaced at a predetermined distance, a plurality of sections of the outer sheath is stripped from the first cable to expose the insulation core wires A, wherein each of the sections has a predetermined length. Each of the second cables has two insulation core wires B, the insulation core wires B at one end thereof being respectively electrically connected with the insulation core wires A at each of the positions where the outer sheath being stripped from the first cable at a predetermined length, the core wires B at the other end thereof being connected with a lamp holder in which a lamp bulb is mounted. The first cable at the positions where the outer sheath being stripped a predetermined length, and the insulation core wires A and B at the positions where the electrical connections are formed, are completely enclosed by a plurality of sealing T-shaped connectors formed by plastic injection molding.

The insulation core wires B are positioned on the insulation core wires A via a T-shaped inner frame in a clamping and overlapping manner, respectively. A mechanical and electrical connection is formed by conductive pins extending through a side wall of said T-shaped inner frame and piercing the overlapped insulation core wires A and B. The T-shaped inner frame and conductive pins are completely covered within the sealing T-shaped connector. The sealing T-shaped connector can include a lug at the top of the connector to facilitate hanging the light string.

In certain embodiments of the first aspect, the T-shaped inner frame is comprised of a first side frame and a second side frame when assembled. In an advantageous embodiment, the first side frame and second side frame of the T-shaped inner frame are identical structurally. The first side frame can have longitudinal grooves corresponding to the insulation core wires A. The second side frame can have transverse grooves corresponding to the insulation core wires B. The first side frame can also have stoppers for limiting the length of the insulation core wires B extending therein at the top thereof.

In further advantageous embodiments the second side frame in the side wall thereof is provided with pin holes, or apertures, at the positions corresponding to where the insulation core wires A and insulation core wires B are overlapped.

In still further advantageous embodiments the frame is provided with two pairs of connecting legs and connecting holes of corresponding dimensions, respectively. The connecting legs are fixed in the connecting holes after the first side frame and the second side frame are assembled together.

The light holder/lamp holder can be made from a soft material by injection molding. At the bottom of the lamp holder there can be material that protrudes to the upper portion of a lamp bulb when a lamp is securely fitted in the lamp holder, thereby creating an interference fit between the protruding portion of the lamp holder and the upper portion of the lamp bulb.

In another aspect the present invention provides a method for manufacturing a light string, such as the light string described above. The method can include the steps of cutting a primary cable of predetermined length from a raw material cable, stripping the outer sheath of the primary cable at two opposite ends to expose the insulation core wires contained therein, stripping the insulating layers of the insulation core wires at the two ends to expose the conductors, mechanically connecting the conductors of the insulation core wires at the two ends to the conductive prongs of the male and female plugs respectively, forming the male and female plugs by plastic injection molding, at the predetermined spacing, stripping the outer sheath from an interior section of the primary cable a predetermined length to expose the insulation core wires therein, positioning the insulation core wires of the primary cable and the insulation core wires of each of a secondary cables of predetermined length in the T-shaped inner frame correspondingly in polarity, and mounting the assembled T-shaped inner frame with the positioned and overlapped insulation core wires to a nailing machine, so as to impact the conductive pins into the insulation core wires A and B at where they are overlapped, forming the sealing T-shaped connector on the T-shaped inner frame with the conductive pins impacted by plastic injection molding, wherein the T-shaped inner frame and the conductive pins are completely covered within the sealing T-shaped connector; repeating the positioning and forming steps to complete the connections between the first cable and all of the second cables and to form all of the sealing T-shaped connectors, and cooling the resulting light string in the air to ordinary temperature.

The method can further include, during the positioning step, placing the insulation core wires of the primary cable into the longitudinal grooves of the first side frame, and the insulation core wires of the secondary cable into the transverse grooves of the second side frame, and assembling the first side frame and second side frame together.

The light string according to the invention has a substantial improvement compared with the light strings according to the prior art, the combination of the T-shaped inner frame and conductive pin adopted enables a more reasonable structure, a more stable product, and a high efficiency production by eliminating the processes of partially stripping off the insulation layers, connecting the copper prongs to the conductors of the insulation core wires, piercing the copper prongs into the conductors of the insulation core wires and bending the copper prongs. According to the present invention, the automatic production is easily achieved. As the electric connection is made in a way that the copper prongs pierce through the insulation, the connection is sealed hermetically, the negative impacts on the electric connection caused by molten plastic is eliminated, and thus the manufacturing component failure rate is significantly reduced. As a pre-formed T-shaped inner frame is used in the sealing T-shaped connector, in other words the sealing T-shaped connector is formed in two steps, the volume of the plastic injected once for injection molding the T-shaped connector is reduced, the resulting product is easily hardened on cooling, the time for cooling down the product is shortened and thus production efficiency is increased. In addition to above, the reduced volume of the plastic injected once significantly addressed the problem of the shrink of the sealing T-shaped connector.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
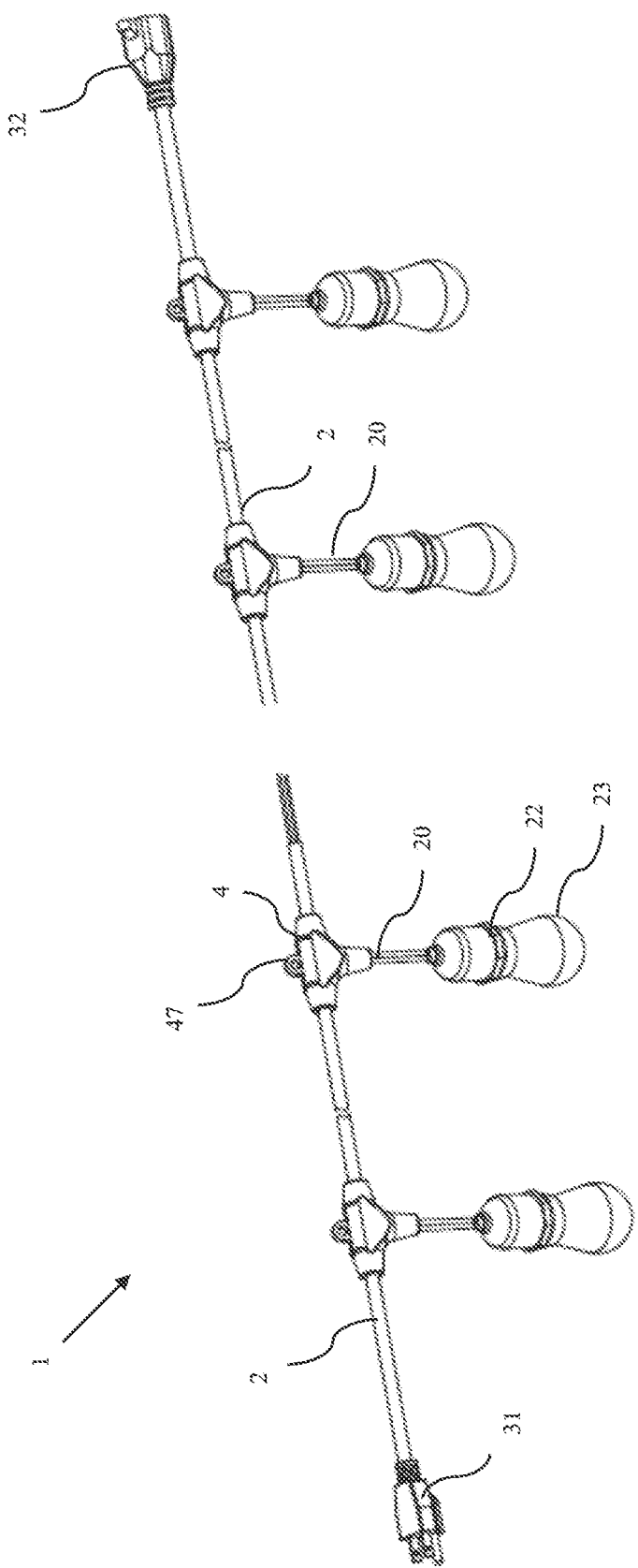
FIG. 1 is an illustration in perspective view of a weatherproof light string according to the invention.

The present invention provides an improved weatherproof light string and improved methods of manufacturing the light string. Outdoor light strings are popular and versatile light sources that can be used to illuminate an outdoor area by suspending a string of lights across or above the area to light the surrounding environment. These light strings are commercially available and can generally be characterized as having a central electrical cable of a length often about twelve (12) to eighteen (18) meters. A plurality of secondary cables are affixed to, and in electrical communication with, the central cable at roughly equidistant points. The secondary cables are designed to hang from the suspended central cable. The amount by which they hang below the central cable is determined by the length of the secondary cables.

These light strings are typically produced in a multi-step process. First, a multiple-core cable is cut to a predetermined length to yield a primary cable. The multiple-core cable will generally include a phase line and a zero line and/or a ground line. Male and female plugs are added to opposite ends of the primary cable. Then, the outer sheath is stripped from the multiple-core primary cable at a plurality of locations corresponding to the spacing distance desired between adjacent lamps. The stripping exposes the individual insulated conductors within the multiple-core cable. A tool is then used to strip away a small amount of the insulation from individual conductors and partially expose the conductor for the phase line and the zero line of the multiple-core cable. Secondary cables are then cut to the desired length. Connecting copper prongs are affixed to the conductors (including a phase line and a zero line) of each of the secondary cables and then the copper prongs are inserted into the conductors of primary cable where the insulation layer has been partially stripped away. This is followed by a bending of the copper prong over the conductor to which it has been inserted. An external cover of plastic is then injection molded over the junction of the primary cable and the secondary cable to protect and seal the structures therein, completely covering the exposed core wires, conductors and copper prongs. The resulting cover is then allowed to air-cool, yielding the end product.

The light string produced by this process has a low production efficiency. This occurs for numerous reasons including the requirement of the partial stripping of the insulating layers of the inner insulated core wires, and due to the insertion of the copper prongs when connecting with the core wires of the secondary conductor into the multiple-strand conductors of the insulation core wires, followed by the bending of the copper prongs over the conductor of the primary cable. This process is rather complicated and this complication makes it difficult to achieve the necessary level of automation in manufacturing. The core wires are also frequently damaged, and even partially cut-off, when the insulating layers are being stripped from the conductors of the insulation core wires. Also, as mentioned above, an external cover of plastic is injection-molded over the junction of the primary cable and the secondary cable to protect and seal the structures therein, completely covering the exposed core wires, conductors and copper prongs. While this cover is being formed, as the multiple-strand conductors are exposed and the copper prongs pierce into the multiple strand conductors, the molten plastic may flow into the gap between the copper prongs and the multiple strand conductor, causing bad contacts there-between. This can even result in a disconnection of the electrical connections, leading to a low yield in light string production. If these defects occur, such as bad contacts, reworking is required to fix the defective products. Resolving these defects is a time and labor consuming process, thus increasing the final costs of a light string produced in such a manner. Lastly, the external plastic cover, which is made by one-shot plastic forming, requires a large volume of injected plastic. The volume of the resulting plastic-injected structure is significant, making it difficult to harden by cooling. This can easily lead to deformation or damage caused by the premature removal of the sealing T-shaped connector from the mold. And after hardening, the resulting plastic-injected structure may have significant shrinking defects impacting its appearance or even limiting its application. Because of these numerous short-comings, an improvement in the design and manufacturing of light strings is required and the solutions to those deficiencies is solved by the present invention.

Turning to the figures, FIG. 1 is an illustration of an exemplary weatherproof light string according to certain aspects of the invention. The weatherproof light string 1 has a central cable 2 and a plurality of secondary cables 20 configured to provide electricity to the lamp bulb 23 that is affixed to the lamp holder 22. Thus, the lamp bulb is 23 suspended from, and in electrical communication with, the central cable 2 by the secondary cable 20. The secondary cables 20 are joined to the central conductor 2 within a sealing T-shaped connector 44. The sealing T-shaped connector 4 is provided with a lug 47 at the top thereof, for convenience in hanging or fixing the light string in use. The central cable 2 has a male plug 31 and a female plug 32 at opposing ends. A plurality of lights strings 1 can be coupled in series by inserting the male plug 31 of one light string into the female plug 32 of another light string to create a light string of desired length.

Figure 2:
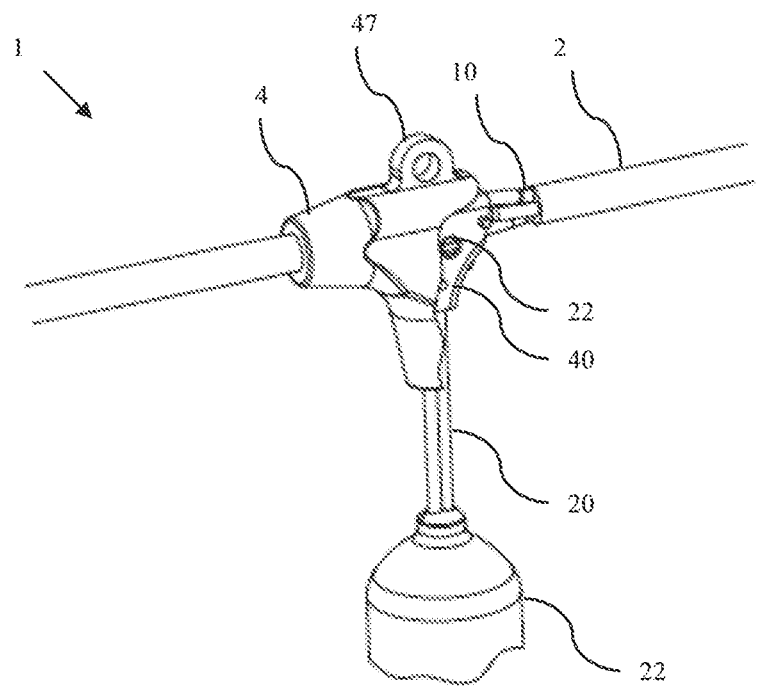
FIG. 2 is an illustration in perspective view of a segment of the weatherproof light string of FIG. 1 with the sealing T-shaped connector shown partially cut-away to reveal the T-shaped inner frame contained therein.

FIG. 2 illustrates a section of the weatherproof light string 1 shown in FIG. 1, with a portion of the sealing T-shaped connector 4 cut-away to reveal the T-shaped inner frame 40. The insulation core wires 10 within the central cable 2 are also exposed in the cut-away by removal of the outer sheath of the central cable 2. Thus, the central cable 2 is a cable of predetermined length that comprises an outer sheath for covering the three insulated core wires 10, where the insulated core wires 10, include a phase line, a zero line and a ground line. The outer sheath of the central cable 2 is stripped from the central cable 2 for a predetermined length at a plurality of positions spaced along the length of the central cable, so as to expose the insulated core wires 10 therein to facilitate electrical communication with the secondary cables 20 (See also FIGS. 7-9). In addition, each of the secondary cable 20 comprises two insulated core wires including a phase line and a zero line. The secondary cables 20 are electrically-connected with the insulation core wires 10 at one end of each secondary cable 20 in the region of the central cable 2 where the outer sheath of the central cable has been stripped to expose the insulated core wires 10. The other end of the secondary cable 20 is connected to a lamp holder 22 in which a lamp bulb 23 is mounted. Thus, the electrical connections are formed between the insulated core wires 10 of the central cable 2 and the secondary cables 20 at the region of the central cable 10 where the outer sheath has been stripped and at one end of the secondary cable 20. The region where the electrical connection is formed is completely enclosed by a sealing T-shaped connector 4 formed by plastic injection molding.

Figure 5:
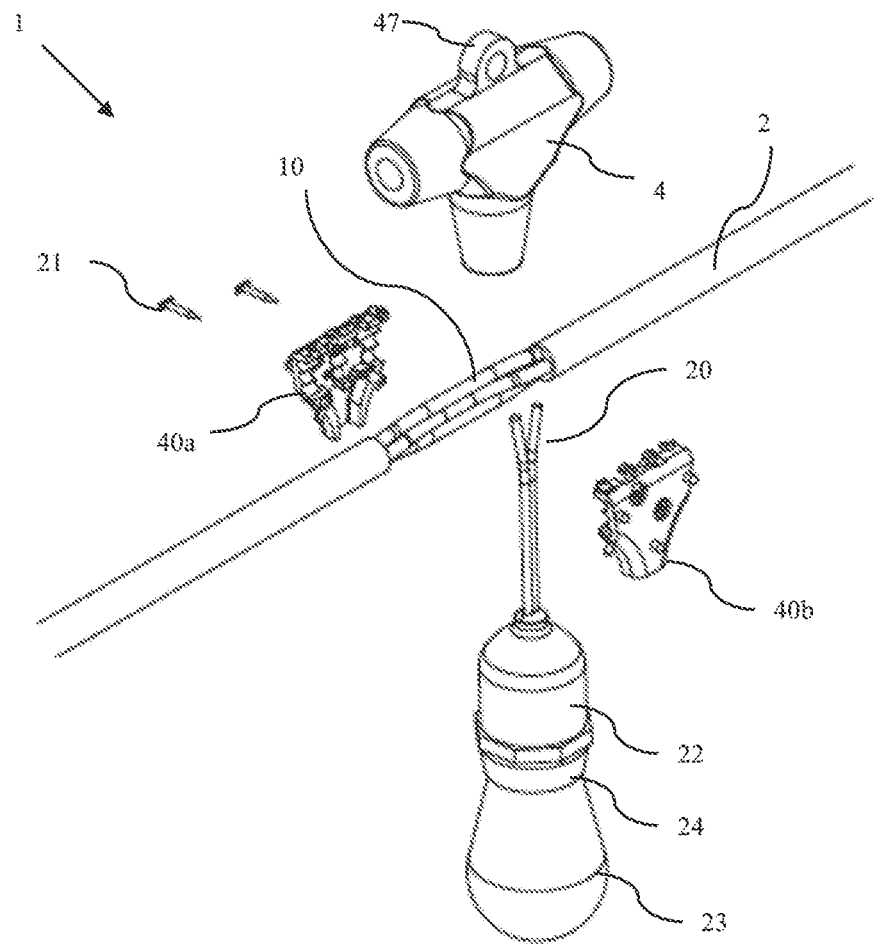
FIG. 5 is an illustration in perspective view (blown-apart) of the components used to assemble the junction between a primary cable and a secondary cable when constructing a light string according to aspects of the present invention.
Figure 6:
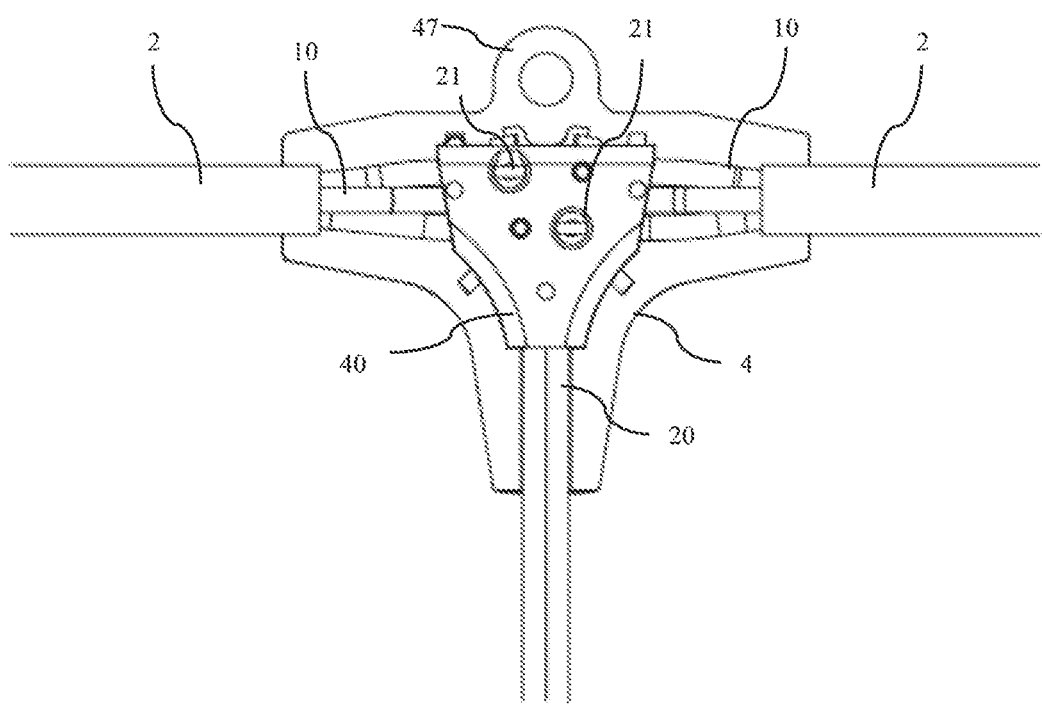
FIG. 6 is an illustration in side view of a section of a light string where the sealing T-shaped connector has been shown in cut-away to reveal the T-shaped inner frame assembled with the primary and secondary cables as contained in a finished sealing T-shaped connector.

A T-shaped inner frame 40 is completely disposed within the sealing T-shaped connector 4 (See also FIG. 6). The T-shaped inner frame 40 is comprised of a first side frame 40a and a second side frame 40b (e.g. see FIGS. 3-6). A conductive pin can also be seen on the T-shaped inner frame 40 where the frame 40 is exposed in the cut-away of the sealing T-shaped connector 4.

Figure 3:
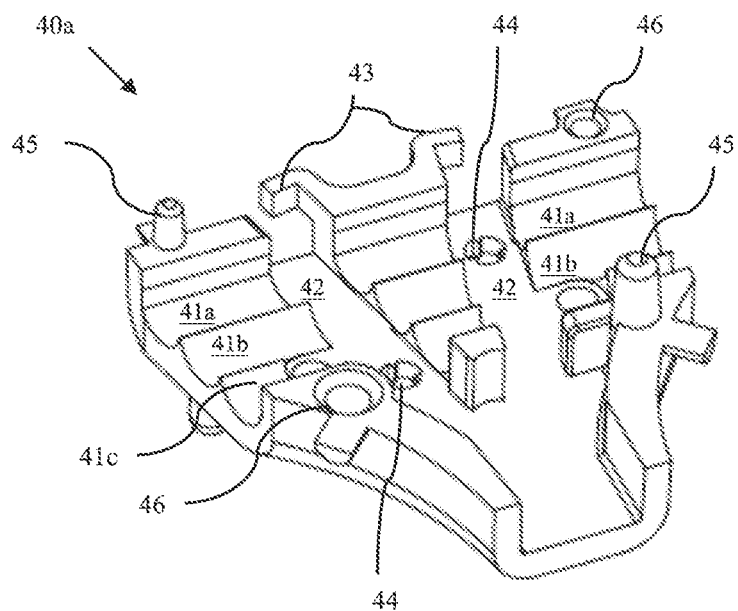
FIG. 3 is an illustration in perspective view of a first side frame of the T-shaped inner frame.

FIG. 3 illustrates a first side frame 40a of the T-shaped inner frame 40. The first side frame 40a has a set of three insulated core wire grooves 41 (individually labeled 41a-41c) designed to individually hold each of the three insulated core wires 10 of the central cable 2 as the central cable 2 passes through the T-shaped inner frame 40.

The first side frame 40a also has a pair of secondary cable grooves 42 designed to individually hold each of the two insulated core wires of the secondary cable 20 as the central cable 2 passes into the T-shaped inner frame 40. The first side frame 40a has a pair of stoppers 43 for limiting the length/extension of the secondary cable wires 20 extending therein. The stoppers 43 are capable of preventing the secondary cable 20 from slipping outwards when the conductive pins 21 (not shown; see FIG. 14 for example) are inserted, as well as limiting the length of the secondary cable 20 extending into the T-shaped inner frame 40, thereby ensuring a proper length of the second cables 20 exposed after the production is completed, to maintain the light bulb 23 in a line vertically toward the ground.

In other words, the first side frame 40a has a set of longitudinal grooves 41 designed to receive and secure the insulated core wires 10, and a set of transverse grooves 42 designed to receive and secure the insulation core wires of the secondary cable 20. These grooves increase the location accuracy of the insulated core wires, and consequently increase the success rate of forming the proper electrical connection when the conductive pins 21 are inserted into the insulated core wires.

The first side frame 40a has a pair of pin holes 44 in the sidewall of the frame 40a. The pin holes are designed to guide the placement of conductive pins 21 upon insertion of the pins through the desired insulated core wire 10 and the desired secondary cable 20. In other words, the pin holes 44 are at the positions corresponding to where the insulated core wire 10 of the primary cable 2 and the core wires of the secondary cable 20 are overlapped. The pin holes 44 are also arranged to reduce the resistance produced while the conductive pins 21 are being impacted into the insulation core wires, resulting in higher accuracy and stability of the connection.

Figure 4:
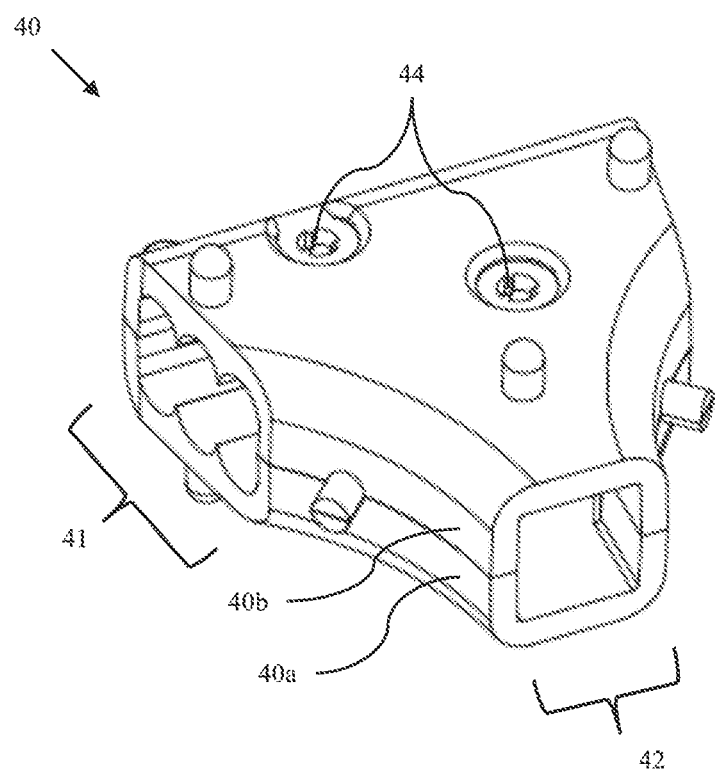
FIG. 4 is an illustration in perspective view of a T-shaped inner frame assembled from a first side frame and a second side frame.

Turning to FIG. 4, the T-shaped inner frame 40 is comprised of a first side frame 40a and a second side frame 40b, thereby simplifying the manufacturing process of the T-shaped inner frame 40, as well as the assembling process of the T-shaped inner frame 40 and the insulation core wires (10 & 20). Furthermore, the first side frame 40a and a second side frame 40b are designed to have an identical structure. So despite the fact that they are separately labeled "40a" and "40b", they are in fact the same part. In other words, the two side frames can be created as an identical part, such as from an identical mold. In use, the first side frame 40a and a second side frame 40b are affixed together to form a T-shaped inner frame 40, which further simplifies the manufacturing process. The first side frame 40a and a second side frame 40b are provided with two pairs of connecting legs 45 and connecting holes 46 of corresponding dimensions and layout, respectively (See FIG. 3), with the holes 46 positioned on the respective frame (e.g. first side frame 40a) to matingly receive the connecting legs of a second frame (e.g. second side frame 40b). Thus, connecting legs 45 are fixed in the connecting holes 46 after the first side frame 40a and a second side frame 40b are assembled together. Pin holes 44, defining an aperture through which conductive pins 21 can be inserted during the manufacturing process, are seen on the outer surface of second side frame 40b of the T-shaped inner frame 40 shown in FIG. 4. The entry points for the primary cable 2 (i.e. insulated core wire grooves 41) and the secondary cable 20 (i.e. secondary cable grooves 42) are also evident in the T-shaped inner frame 40 shown in FIG. 4.

FIG. 5 illustrates how the various elements of the light string are assembled together. First, the three insulated core wires 10 of the central cable 2 would be fitted individually within the insulated core wire grooves 41 of the first side frame 40a (See FIG. 12). Then, the each of the two core wires of the secondary cable 20 would be fitted individually within the secondary cable grooves 42 (See FIG. 13). The two halves of the T-shaped inner frame 40 (i.e. the first side frame 40a and a second side frame 40b) would be affixed together (See FIG. 14). This will secure the insulated core wires 10 of the central cable 2 and the two core wires of the secondary cable 20 in place, with the insertion of the secondary cable limited by the stoppers 43. Conductive pins 21 are then inserted/driven through the two pin hole 44 on the outside of the T-shaped inner frame 40.

Figure 15:
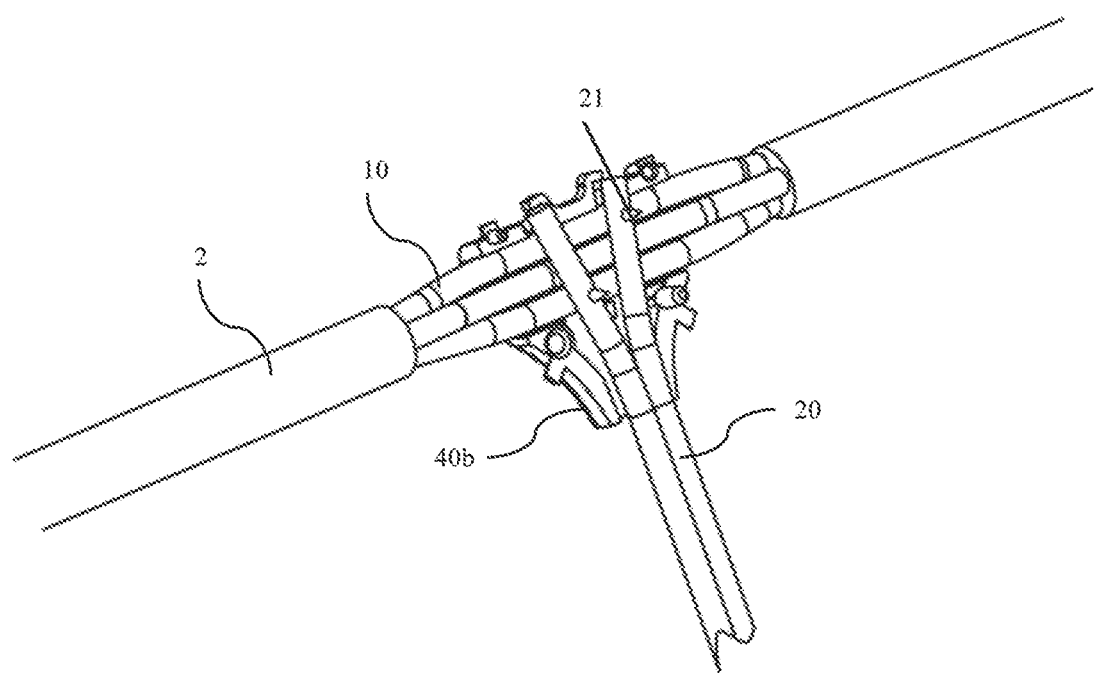
FIG. 15 is an illustration in perspective view of a first side of a T-shaped inner frame securing three insulated conductors of a primary cable with the insulated conductors of a secondary cable electrically connected to two of the to the insulated conductors of a primary cable using a pair of conductive pins.

FIG. 15 shows the resulting structure discussed immediately above, but with first side frame 40a removed. As can be seen, the insulated core wires 10 of the central cable 2 and the two core wires of the secondary cable 20 in held in place with a defined orientation. This allows the conductive pins 21 to be inserted through, and electrically join, two of the three the insulated core wires 10 of the central cable 2 to the two core wires of the secondary cable 20. In other words, the phase line of the insulated core wires 10 is joined with one conductive pin to one of the insulated conductors of the secondary cable 20, while the zero line of the insulated core wires 10 is joined with a second conductive pin to the other the insulated conductor of the secondary cable 20.

The insulation core wires of each of the secondary cables 20 are correspondingly positioned on the insulation core wires 10 via a T-shaped inner frame 40 in a clamping and overlapping manner, a mechanical and electrical connection is thereby formed between the primary and secondary cable by conductive pins 21, each extending through a side wall of the T-shaped inner frame 40 and piercing the insulation core wires 10 of the primary cable and the insulation core wires of the secondary cable in a region where the core wires overlap. The T-shaped inner frame 40 and the conductive pins 21 are completely covered within the sealing T-shaped connector 4 (See e.g. FIGS. 1 and 6). While connected, the phase line corresponds to the phase line, and the zero line corresponds to the zero line. According to actual needs, the primary cable 1 may comprise two insulation core wires with a phase line and a zero line, only, and while connected it also follows the rule of the phase line corresponding to the phase line and the zero line corresponding to the zero line. If needed, the primary cable 2 may comprise a plurality of phase lines and zero lines.

A three-core cable is generally selected as the primary cable 2. The primary cable 2 will comprise three insulation core wires respectively used as a zero line, a fire line and a ground line, and an outer sheath covering the insulation core wires for enhanced durability and applicability. For example, cables designed to meet U.S. standard, such as SJTW 18AWG*3C, 16AWG*3C and 14AWG*3C, may be used for this application.

The male plug 31 and female plug 32 also have a standard plug configuration. In use the male plug 31 is plugged into a socket of the grid. The plurality of second cables 20 (together with the lamp holders 22 and lamp bulbs 23) connected to the primary cable 2 form a plurality of parallel circuits. In a preferred embodiment of the invention, the primary cable 2 has a length of about 14.6 m, the secondary cables 20 are evenly distributed on the primary cable 2 at a distance of about 0.6 m from each other. Each of the secondary cables 20 has a length of about 8 cm. The lamp holders 22 are U.S. standard E26 sockets, or E27 sockets when employing a European standard, and the lamp bulbs 23 are incandescent light bulbs. With a proper weight, such a light string is capable of providing convenience in packaging and transportation. In addition to above, the secondary cables 20 distributed on the primary cable 2 have balanced photic and electric properties, including current, voltage drop, brightness and etc. If a longer light string is required in practice, more than one light string can be connected in series (the male plug 31 of a light string is plugged into the female plug 32 of a previous light string) thereby to lengthen the resulting string, for satisfying the actual needs of a user.

Returning to FIG. 5, the illustration shows a lamp holder 22 affixed to a distal end of the secondary cable 20. The lamp holder 22 is made from a soft material, such as by injection molding, and at the bottom thereof protrudes to the upper portion of the lamp bulb 23, an interference fit is formed between the protruding portion 24 of the lamp holder 22 and the upper portion of the lamp bulb 23. The soft material is tensioned in the interference fit, such that the protrusion portion 24 may tightly embrace the upper portion of the lamp bulb 23, functioning in a water-proof and dust-proof manner.

FIG. 6 shows an assembled T-shaped inner frame 40 with the insulated core wires 10 of the central cable 2 electrically connected using the conductive pins 21 to the two core wires of the secondary cable 20. The assembled T-shaped inner frame 40 is depicted as partially encased in the sealing T-shaped connector 4. The sealing T-shaped connector 4 has a width that exceeds the length in which the outer sheath of the central cable 2 has been removed. This allows the sealing T-shaped connector 4 to completely cover and seal the three insulated core wires 10. The sealing T-shaped connector 4 has an eyelet 47 to facilitate hanging the light string 1 from another object such as by inserting a hook in the eyelet 47.

Figure 7:
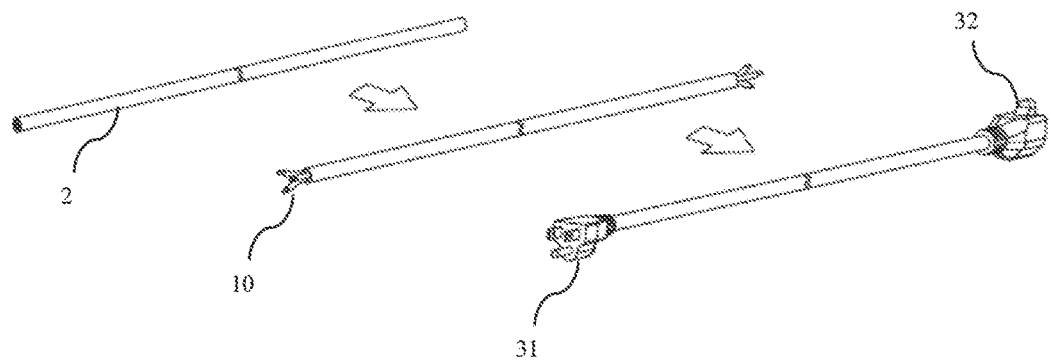
FIG. 7 is an illustration in perspective view depicting, according to aspects of the invention, the process steps of cutting the primary cable to a desired length and affixing the male and female plugs to respective ends of the primary cable.

FIGS. 7 through 17 illustrate various steps in the production of a light string according to the invention. In FIG. 7 a three-core cable is cut to a predetermined length (e.g. about 14.6 m) to create the primary cable 2. The outer sheath is then stripped from the primary cable 2 at opposing ends of the cut cable to expose the insulation core wires 10. The insulation layer of the insulation core wires 10 are then stripped to expose the conductors at the opposing ends of the primary cable. The conductors are then connected to the two ends to the conductive prongs of the male and female plugs 31, 32, respectively, and the male and female plugs 31, 32 are finished by plastic injection molding of the remaining structure of the plugs (31, 32). Depending on the environment where the light string is used, a suitable plug standard is adopted. For example, different plugs are used for Europe and North America respectively. In addition, the plug standards for the two and three cores cables are also different. The embodiment shown in FIG. 7 utilizes a U.S. standard plug for a three-core cable.

Figure 8:
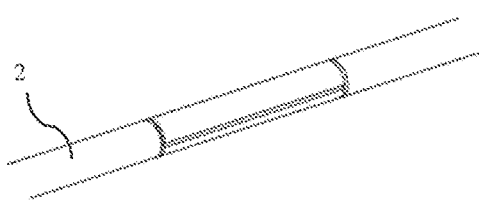
FIG. 8 is an illustration in perspective view depicting, according to aspects of the invention, the process step of cutting the outer sheath of the primary cable to facilitate the junction with a secondary cable.
Figure 9:
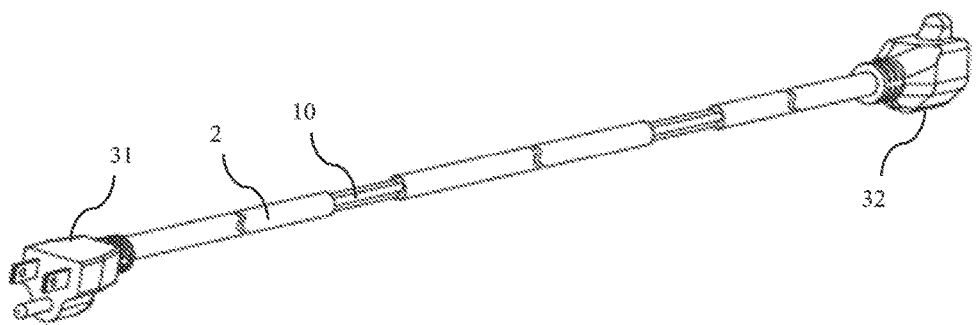
FIG. 9 is an illustration in perspective view depicting, according to aspects of the invention, the process step of removing the outer sheath from a plurality of locations along the primary cable to prepare the cable for the attachment of secondary cables at predetermined spaces.

FIGS. 8 and 9 illustrate the removal, or stripping, of a short section of the outer sheathing from the primary cable 2 to expose the insulated core wires 10 within the primary cable 2. The outer sheathing is removed form a plurality of locations along the primary cable with a predetermined spacing corresponding to the desired distance between adjacent lamps along the weather proof light string. Usually the spacing between adjacent removals of the sheathing is about 0.6 m, the predetermined length of each of the removed sections of sheathing is about 3-5cm, and such a spacing is capable of ensuring good decorative effect and excellent electrical and optical performance.

Figure 10:
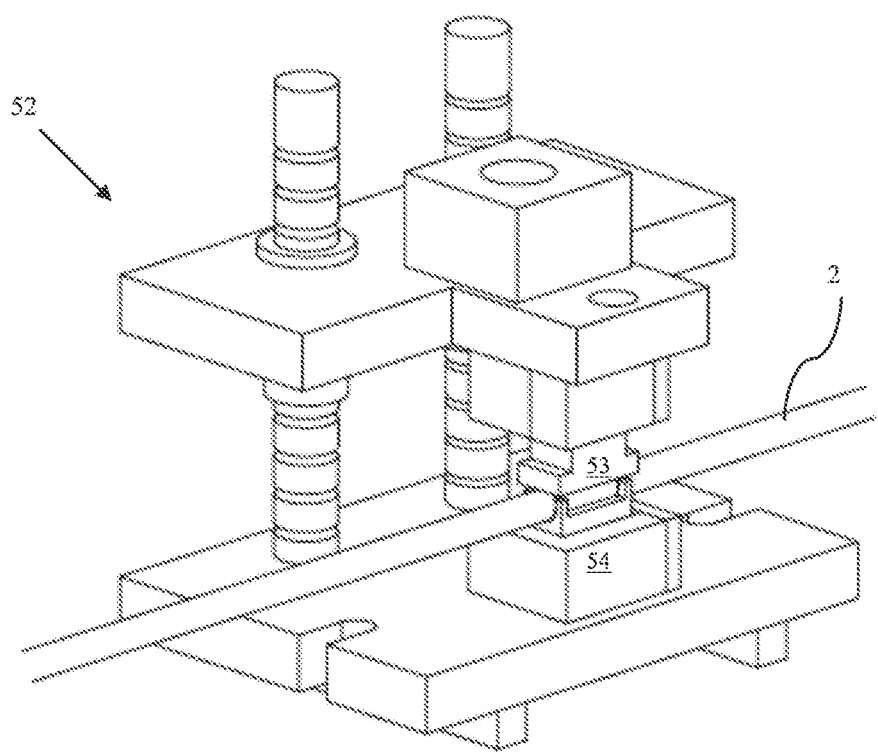
FIG. 10 is an illustration in perspective view of a device for cutting the other sheathing from a centralized region of a multi-core cable according to aspects of the invention.
Figure 11:
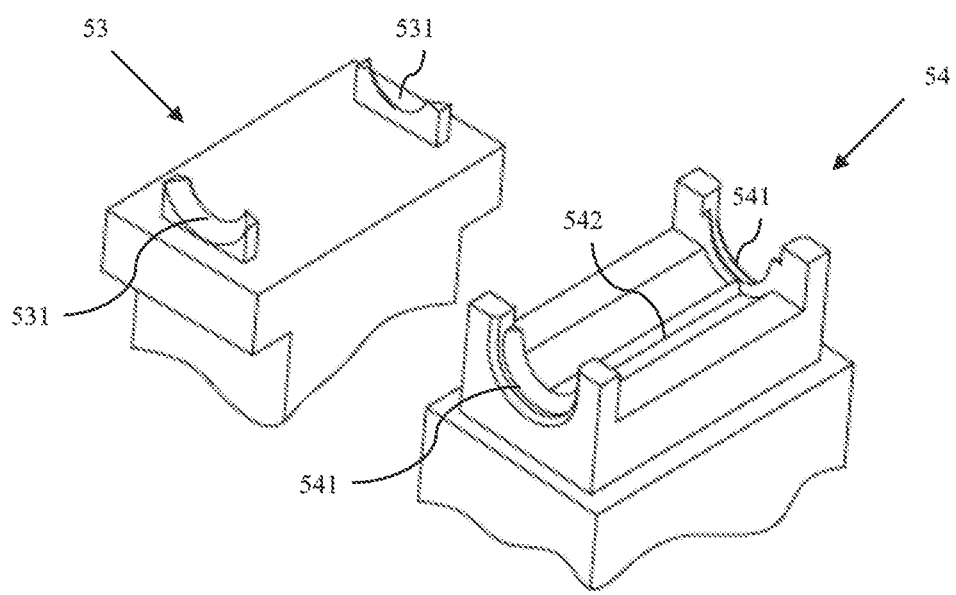
FIG. 11 is an illustration in perspective view of the upper and lower molds of the device as illustrated in FIG. 10.
Figure 17:
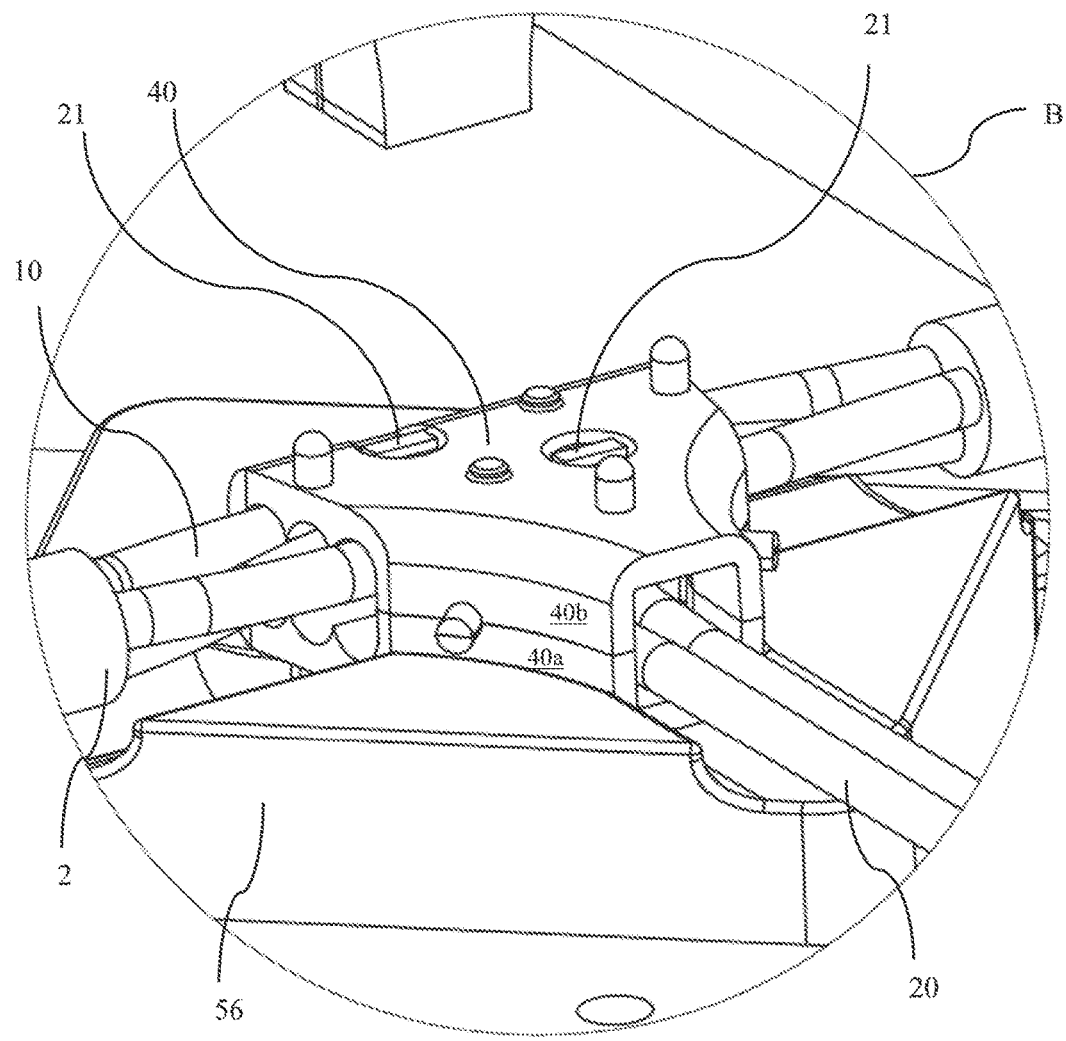
FIG. 17 is an illustration in perspective view of the inset labeled "B" in FIG. 16.

FIGS. 10 and 11 illustrate the features of a tool designed to strip the outer sheath. This tool has enabled increased production efficiency, while lowering the cost, by streamlining the steps involved in removing the outer sheath. FIG. 17 illustrates the stripping device 52 for stripping the outer sheath, while FIG. 18 illustrates the key components for the stripping device 52. Those key components are an upper mold 53 and lower mold 54. The lower mold 54 has two semicircle lower blades 541. The distance between the two blades 541 is consistent with the predetermined length of the outer sheath sections stripped. The upper mold 53 has a pair of upper blades 531 corresponding to the two semicircle lower blades 541 of the lower mold 54. The lower mold 54 is further provided with a longitudinal lower blade 542. The radius of the upper and lower blades depends on the radius of the cable to be processed and the thickness of the sheath. In operation, the upper mold 53 and the lower mold 54 of the device 52 are pressed towards each other to cut apart the outer sheath, and the outer sheath cut is then torn off to expose the insulated core wires 10 of the central cable 2. FIG. 8 illustrates the cuts on the sheath after the central cable has been processed by the stripping device 52. FIG. 9 illustrates the cable after the stripping is completed.

Figure 12:
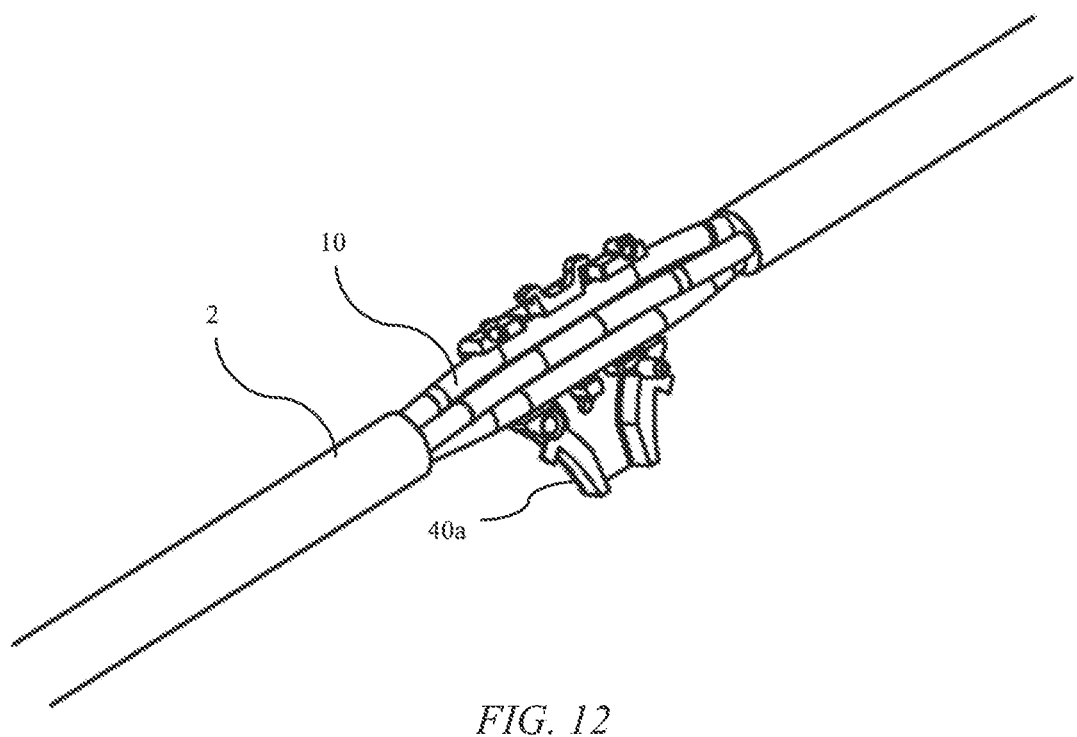
FIG. 12 is an illustration in perspective view of a first side of a T-shaped inner frame securing three insulated conductors of a primary cable.
Figure 13:
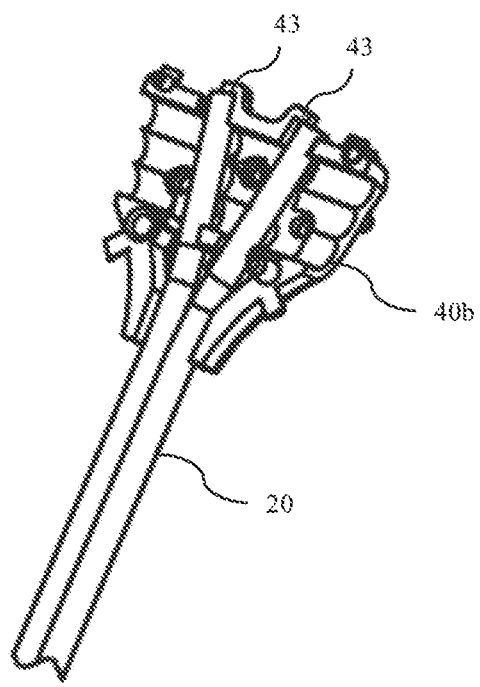
FIG. 13 is an illustration in perspective view of a second side of a T-shaped inner frame securing two insulated conductors of a secondary cable.
Figure 14:
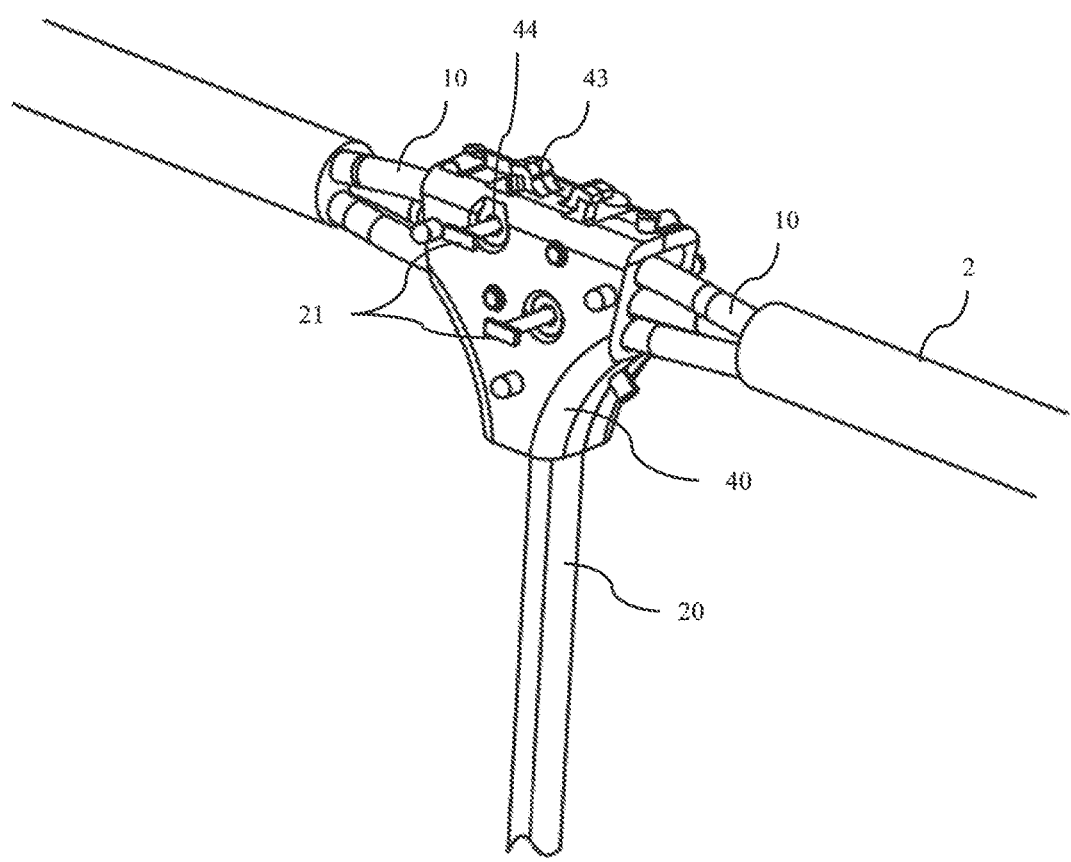
FIG. 14 is an illustration in perspective view of a pair of conductive pins being inserted into the apertures of a T-shaped inner frame.

FIG. 12 illustrates the positioning the insulation core wires 10 of the primary cable 2 within first side frame 40a of the T-shaped inner frame 40, while FIG. 13 illustrates the positioning of the insulation core wires of the second cable 20 within second side frame 40b of the T-shaped inner frame 40. The desired polarity and mounting can be achieved with the assembled T-shaped inner frame 40 with the conductors positioned and overlapped as necessary. A nailing machine can be used to impact the conductive pins 21 into the insulation core wires of the primary and secondary cables at the point where they overlap. FIG. 14 shows the conductive pins 21 as the are inserted into the pin holes 44 of the T-shaped inner frame 40. 21. To aid in the understanding of the invention, the conductive pins 21 are shown only partially inserted in FIG. 14.

As discussed above, the T-shaped inner frame 40 is preferably constructed from a structurally identical first side frame 40a and a second side frame 40b. As demonstrated in FIGS. 12-14, production of the light string includes placing the insulation core wires 10 of the primary cable 2 into the longitudinal grooves 41 of the first side frame 40a, and the insulation core wires of the secondary cable 20 into the secondary grooves 42 of the second side frame 40b, and joining the first side frame 40a and the second side frame 40b together, as shown in FIGS. 14 and 15. The second side frame 40b is eliminated in FIG. 15 to better illustrate the placement of the insulated core wires 10 of the primary cable 2, the core wires of the secondary cable 20, and the conductive pin 21 in the T-shaped inner frame 40.

Figure 16:
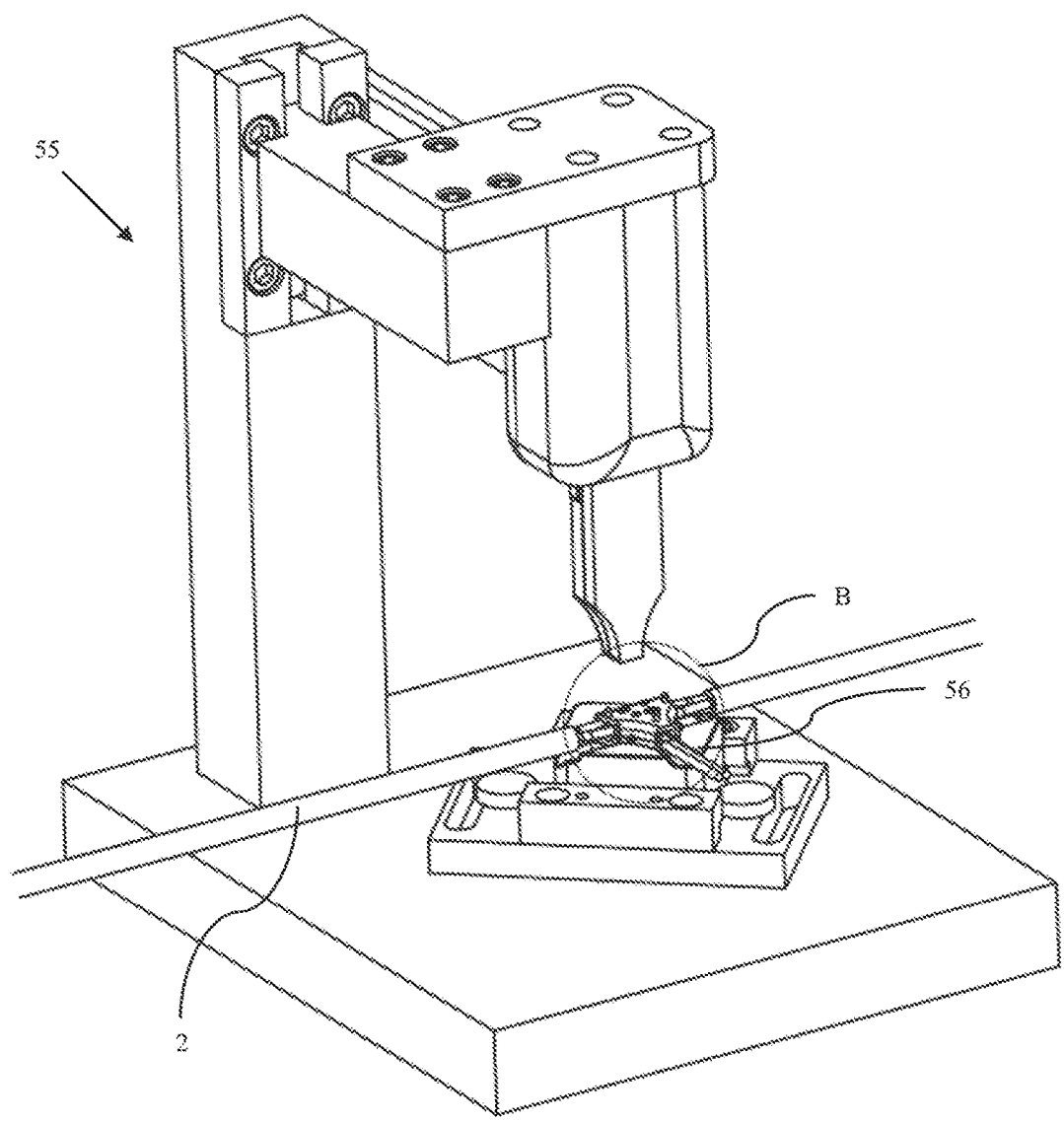
FIG. 16 is an illustration in perspective view of the connector of the device and tool for nailing.

FIGS. 16 and 17 illustrate the device 55 and tool 56 for impacting the conductive pins 21, with the T-shaped inner frame 40 assembled and positioned in a proper position. The device 55 is designed to impact the conductive pins 21, which drives the conductive pins 21 into the insulation core wires of both the primary cable 2 and the secondary cable 20.

Once the conductive pins have been inserted into the insulation core wires of both the primary cable 2 and the secondary cable 20, a sealing T-shaped connector 4 is formed by injection plastic molding over the T-shaped inner frame 40 See for example FIGS. 1 and 2).

The steps of removing the sheathing, placing the insulated conductors in the proper orientation within a T-shaped inner frame 40, inserting the conductive pin 21 into the T-shaped inner frame 40 with the insulated conductors and molding a sealing T-shaped connector 4 is repeated for each predetermined space along the primary cable 2.

The light string according to the invention provides a substantial improvement over the light strings according to the prior art, as the technical solution of the T-shaped inner frame and conductive pin as taught herein enables a more reasonable structure, a more stable product, and a higher efficiency production.

All references cited in the present application are incorporated in their entirety herein by reference to the extent not inconsistent herewith.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A light string, comprising:
    a first cable of a predetermined length having an outer sheath, and a plurality of second cables;
    said first cable comprising at least two insulation core wires A, and provided with at one end thereof a male plug and at the other end thereof a female plug that can be matched with said male plug;
    spaced at a predetermined distance, a plurality of sections of said outer sheath being stripped from said first cable to expose said insulation core wires A, wherein each of the sections has a predetermined length;
    each of said second cables comprising two insulation core wires B, said core wires B at one end thereof being electrically connected with the insulation core wires A at each where the outer sheath being stripped from said first cable a predetermined length, and at the other end thereof being connected with a lamp holder in which a lamp bulb is mounted;
    said first cable at where the outer sheath being stripped a predetermined length, and the insulation core wires A and insulation core wires B at where the electrical connections are formed, are completely covered by a plurality of sealing T-shaped connectors formed by plastic injection molding;
    wherein, said insulation core wires B of each of the second cable are positioned on the insulation core wires A via a T-shaped inner frame in a clamping and overlapping manner, a mechanical and electrical connection is formed therebetween by conductive pins extending through a side wall of said T-shaped inner frame and piercing the overlapping insulation core wires A and B the T-shaped inner frame and conductive pins are completely covered within the sealing T-shaped connector.

2. The light string according to claim 1 wherein the T-shaped inner frame is assembled by a left side frame and a right side frame.

3. The light string according to claim 2, wherein the left side frame and right side frame of the T-shaped inner frame are identical structurally.

4. The light string according to claim 3, wherein the left side frame is provided with longitudinal grooves corresponding to the insulation core wires A.

5. The light string according to claim 3, wherein the left side frame is provided with transverse grooves corresponding to the insulation core wires B.

6. The light string according to claim 3, wherein the left side frame is provided with stoppers for limiting the length of the insulation core wires B extending therein at the top thereof.

7. The light string according to claim 3, wherein the left side frame in the side wall thereof is provided with pin holes at the positions corresponding to where the insulation core wires A and B are overlapped.

8. The light string according to claim 3, wherein the left side frame and right side frame are provided with two pairs of connecting legs and connecting holes of corresponding dimensions, respectively, the connecting legs are fixed in the connecting holes after the left side frame and the right side frame are assembled together.

9. The light string according to claim 1, wherein the sealing T-shaped connector is provided with a lug at the top thereof.

10. The light string according to claim 1, wherein the light holder is made from a soft material by injection molding, and at the bottom thereof protrudes to the upper portion of the lamp bulb, an interference fit is formed between the protruding portion of the lamp holder and the upper portion of the lamp bulb.

11. A method for manufacturing light string, comprising the steps of:
    cutting the first cable of predetermined length from raw material cable;
    stripping the outer sheath of the first cable from the first cable at two opposite ends to expose the insulation core wires A, stripping the insulation layers of the insulation core wires A from the insulation core wires A exposed at the two ends to expose the conductors, mechanically connecting the conductors of the insulation core wires A at the two ends to the conductive prongs of the male and female plugs respectively, and forming the male and female plugs by plastic injection molding;
    at the predetermined spacing, stripping the outer sheath from the first cable a predetermined length, to expose the insulation core wires A therein;
    positioning the insulation core wires A of the first cable and the insulation core wires B of the first cable in the T-shaped inner frame correspondingly in polarity, and mounting the T-shaped inner frame assembled with the positioned and overlapped insulation core wires to a nailing machine, so as to impact the conductive pins into the insulation core wires A and B at where they are overlapped;
    forming the sealing T-shaped connector on the T-shaped inner frame with the conductive pins impacted by plastic injection molding, wherein the T-shaped inner frame and the conductive pins are completely covered within the sealing T-shaped connector;
    repeating the positioning and forming steps to complete the connections between the first cable and all of the second cables and to form all of the sealing T-shaped connectors, and cooling the resulting light string in the air to ordinary temperature.

12. The method according to claim 11, wherein the positioning step includes placing the insulation core wires A of the first cable into the longitudinal grooves of the left side frame, and the insulation core wires B of the second cable into the transverse grooves of the right side frame, and assembling the left and right side frames together.

* * * * *